(12) United States Patent
Yoon et al.

(10) Patent No.: US 8,526,711 B2
(45) Date of Patent: Sep. 3, 2013

(54) APPARATUS AND METHOD FOR RAY TRACING USING PATH PREPROCESS

(75) Inventors: Young Keun Yoon, Daejeon (KR); Jong Ho Kim, Daejeon (KR); Heon Jin Hong, Daejeon (KR); Kangkook Park, Gyeongsangbuk-do (KR); Jae-Hyun Yeom, Gyeongsangbuk-do (KR); Hyo-Tae Kim, Gyeongsangbuk-do (KR)

(73) Assignees: Electronics and Telecommunications Research Institute, Daejeon (KR); Postech Academy-Industry Foundation, Gyeongsangbuk-do (KR)

( * ) Notice: Subject to any disclaimer, the term of this patent is extended or adjusted under 35 U.S.C. 154(b) by 383 days.

(21) Appl. No.: 12/922,075

(22) PCT Filed: Sep. 24, 2008

(86) PCT No.: PCT/KR2008/005668
§ 371 (c)(1),
(2), (4) Date: Sep. 10, 2010

(87) PCT Pub. No.: WO2009/116712
PCT Pub. Date: Sep. 24, 2009

(65) Prior Publication Data
US 2011/0044508 A1 Feb. 24, 2011

(30) Foreign Application Priority Data
Mar. 18, 2008 (KR) .......... 10-2008-0024740
May 9, 2008 (KR) .......... 10-2008-0043559

(51) Int. Cl.
*G06K 9/00* (2006.01)
(52) U.S. Cl.
USPC .......... 382/154; 382/203

(58) Field of Classification Search
USPC .......... 382/154, 203
See application file for complete search history.

(56) References Cited

U.S. PATENT DOCUMENTS

| | | | | |
|---|---|---|---|---|
| 5,594,844 A | * | 1/1997 | Sakai et al. | 345/427 |
| 7,212,160 B2 | * | 5/2007 | Bertoni et | 342/453 |
| 7,751,034 B2 | * | 7/2010 | Sasian et al. | 356/30 |
| 7,764,230 B2 | * | 7/2010 | Chizhik et al. | 342/453 |
| 7,844,264 B2 | * | 11/2010 | Watanabe | 455/423 |
| 7,962,102 B2 | * | 6/2011 | Corral et al. | 455/67.16 |
| 8,234,234 B2 | * | 7/2012 | Shearer | 706/52 |
| 2003/0227457 A1 | * | 12/2003 | Pharr et al. | 345/426 |
| 2006/0287842 A1 | * | 12/2006 | Kim | 702/183 |
| 2006/0290696 A1 | * | 12/2006 | Munshi et al. | 345/428 |
| 2007/0035545 A1 | * | 2/2007 | Hempel et al. | 345/422 |

FOREIGN PATENT DOCUMENTS

| | | |
|---|---|---|
| JP | 2003-318842 A | 11/2003 |
| KR | 1999-0057146 A | 7/1999 |
| KR | 2007-0031516 | 3/2007 |
| KR | 2007-0034205 A | 3/2007 |
| KR | 10-2008-0000936 U | 1/2008 |
| KR | 2008-0000171 U | 1/2008 |

* cited by examiner

*Primary Examiner* — Gregory M Desire
(74) *Attorney, Agent, or Firm* — Rabin & Berdo, P.C.

(57) ABSTRACT

Disclosed is an apparatus and method for ray-tracing using a path preprocess. The method for ray-tracing including launching a ray from a transmitting point at angles with regular intervals, setting a first side of an object where the launched ray is projected as a reference patch, and searching predetermined preprocessed path data for a counterpart patch corresponding to a second side of another object, the second side being exposed to the projected ray reflected or diffracted from the set reference patch, and tracing a transmission path of the reflected or diffracted ray.

7 Claims, 6 Drawing Sheets

Fig. 5

| SEGMENTED REGION NO. | COUNTERPART PATCHES (PATCH NUMBER) WITH RESPECT TO REFERENCE PATCH (ROW) | | | | |
|---|---|---|---|---|---|
| 1 | 1 | 82 | 100 | 0 | 0 |
| 2 | 1 | 82 | 0 | 0 | 0 |
| 3 | 1 | 0 | 0 | 0 | 0 |
| ⋮ | | | ⋮ | | |
| 31 | 52 | 62 | 0 | 0 | 0 |
| 32 | 59 | 22 | 0 | 0 | 0 |
| ⋮ | | | ⋮ | | |
| 51 | 0 | 0 | 0 | 0 | 0 |
| 52 | 0 | 0 | 0 | 0 | 0 |
| ⋮ | | | ⋮ | | |
| 81 | 0 | 0 | 0 | 0 | 0 |
| 82 | 0 | 0 | 0 | 0 | 0 |

APPARATUS AND METHOD FOR RAY TRACING USING PATH PREPROCESS

TECHNICAL FIELD

The present invention relates to a method and apparatus for ray-tracing, particularly, to a method and apparatus for ray-tracing using path preprocess.

BACKGROUND ART

In general, a method for ray-tracing includes an Image Method and Ray Launching.

In the Image Method, when a total transmission distance of a ray is the same as a distance of a straight line from a certain point to the receiving point, the total transmission distance being a transmission distance of the ray until the ray arrives at a receiving point after being reflected from an object several times, the certain point is defined as an Image Point. The Image Method is a method of calculating a transmission distance using the defined Image Point. The Image Method is a relatively simple method to calculate the distance. However, when a complex structure that a plurality of objects are densely aggregated and scattered is analyzed, since, as an example, multiple image points may occur during a process of tracing a certain ray, there is a disadvantage that the Image Method cannot be applied.

The Ray Launching Method is a method that replaces infinite rays launched from a transmitting point with finite rays to sequentially launch the rays and traces a path of the ray until the ray is arrived at a receiving point. The Ray Launching Method may sum power of rays received at a receiving point according to traced multiple paths, and thereby can calculate a path loss or a delay dispersion and also can accurately estimate a propagation characteristic in various environment. Also, the Ray Launching Method is very useful method to estimate field strength and also to calculate the feature of the delay dispersion of a channel required to design a digital communication network. However, the Ray Launching Method has disadvantage in that a calculation thereof is complex.

Also, the Image Method and Ray Launching Method calculate each Image point and reflect point. Since a number of calculations increases as a number of objects increases, a simulation analysis rate for estimating a propagation characteristic is decreased. Accordingly, a preprocess method is applied to improve the analysis rate.

However, since current preprocess methods can calculate a reflection point or image point through a preprocess only after determining a location of a transmitting point, there is a problem in that, when the location of the transmitting point is changed even with respect to the same object, the preprocess is performed again.

DISCLOSURE OF INVENTION

Technical Problem

An aspect of the present invention provides an apparatus and method for ray-tracing to easily and effectively trace a path of ray using a preprocessed path data.

Technical Solution

According to an aspect of the present invention, there is provided an apparatus for ray-tracing using a path preprocess, including: a number of rays determining unit to determine a number of rays to be launched from a transmitting point, a ray launching unit to launch the determined number of rays from a transmitting point at angles with regular interval, a ray tracing unit to search a predetermined preprocessed path data for a second side of another object, the second side of the other object being exposed to a projected ray reflected and diffracted from a first side of an object where the launched ray is projected, and tracing a transmission path of the ray.

According to another aspect of the present invention, there is provided a method for ray-tracing using a path preprocess, including: launching a ray from a transmitting point at angles with regular intervals, setting a first side of an object where the launched ray is projected as a reference patch, and searching predetermined preprocessed path data for a counterpart patch corresponding to a second side of another object, the second side being exposed to the projected ray reflected or diffracted from the set reference patch, and tracing a transmission path of the reflected or diffracted ray.

BRIEF DESCRIPTION OF THE DRAWINGS

FIG. 5 illustrates a mapping result of a counterpart patch with respect to a segmented region of a sphere;

MODE FOR THE INVENTION

Figure 1:
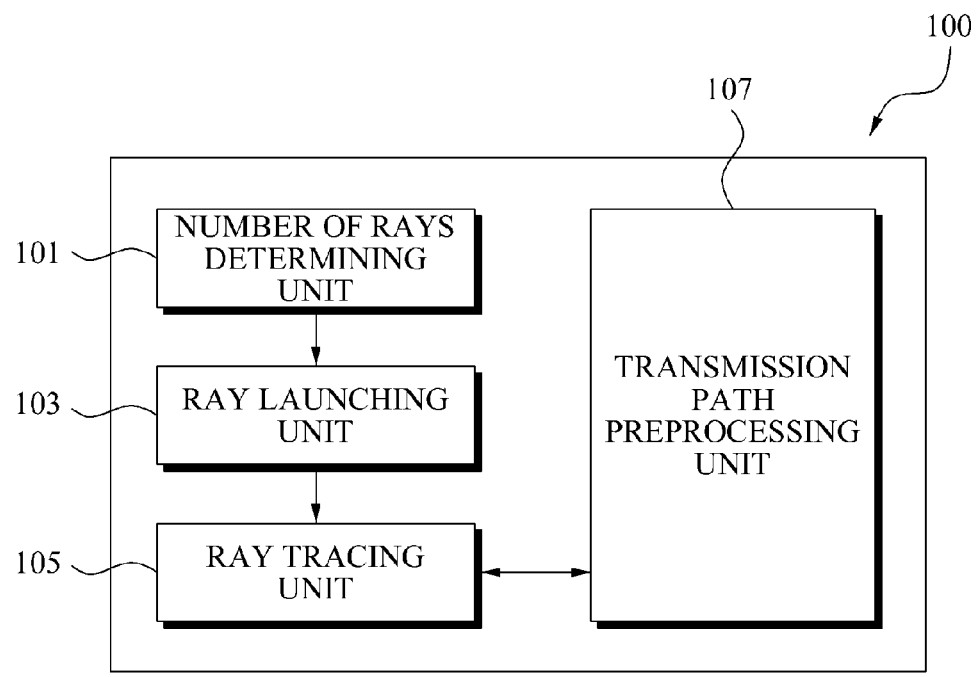
FIG. 1 is a block diagram illustrating a configuration of an apparatus for ray-tracing according to an example embodiment.

Although a few exemplary embodiments of the present invention have been shown and described, the present invention is not limited to the described exemplary embodiments, wherein like reference numerals refer to the like elements throughout.

Hereinafter, an apparatus and method for ray-tracing using a path preprocess according to an example embodiment is described in detail referring to attached drawings.

An apparatus for ray-tracing according to an example embodiment is an apparatus using a Ray Launching Method. Here, the Ray Launching Method is a ray-tracing method that estimates strength of a received signal in consideration of effect of a reflection and diffraction that the ray is undergone until the ray is arrived at a receiving point after launched at angles with regular interval.

FIG. 1 is a block diagram illustrating a configuration of an apparatus for ray-tracing according to an example embodiment.

Referring to FIG. 1, a ray-tracing apparatus 100 may include a number of rays determining unit 101, a ray launching unit 103, a ray tracing unit 105, and a transmission path preprocessing unit 107.

The number of rays determining unit 101 may determine a number of rays to be launched. In this instance, the number of rays determining unit 101 may set a number of rays to a maximum number of rays that a sphere can launch.

The ray launching unit 103 sequentially launches the rays in the space. The ray launching unit 103 may launch a ray at angle with regular interval.

The ray-tracing unit 105 may trace a transmission path direction of which is changed through reflection or diffraction after the ray is projected to an object and geometrical feature, with respect to all the rays. In this instance, the ray-tracing unit 105 may search for a second side of another object exposed to a ray reflected or diffracted from a first side of a certain object where a launched ray is projected referring to a reference patch and counterpart patch of a transmission path preprocessing unit 107, and thereby can effectively and easily trace a transmission path.

The ray-tracing unit 105 may trace the ray until the ray is received. In this instance, the ray-tracing unit 105 may verify whether the ray is received based on whether the ray passes through a reception radius having a center corresponding to a receiving point. For instance, the ray-tracing unit 105 may verify that the ray is received when the ray passes through the reception radius. Herein, the received ray may be a portion of rays that launched from the ray launching unit 103.

Subsequently, the ray-tracing apparatus 100 may estimate strength of the received ray.

The transmission path preprocess 107 preprocesses a transmission path using a reference patch and counterpart patch with respect to every objects, thereby establishing a database of the transmission path. In this instance, the reference patch is a side of a certain object where a ray is projected, and the counterpart patch is a side of a other object which is secondly exposed to the projected ray reflected or diffracted from the reference patch.

The transmission path preprocessing unit 107, unlike a method that traces a transmission path with respect to all objects or geometrical feature existing in a predetermined region, defines a portion of objects and geometrical feature that can be affected by multiple reflections and diffractions of a certain ray as a certain group and predetermine a relative location of the portion of objects and geometrical feature in the defined group.

Accordingly, the ray-tracing apparatus according to an example embodiment can improve a rate of estimating of the transmission path by using a preprocess method of the transmission path and can effectively analyze path since a preprocess with respect to the same object is not performed more than once.

Figure 2:
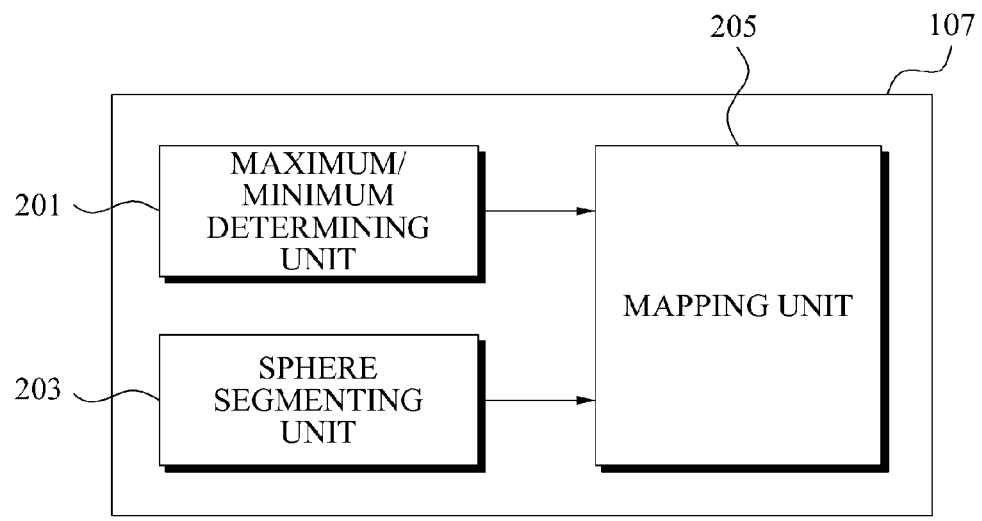
FIG. 2 is a block diagram illustrating a configuration of a transmission path preprocessing unit.
Figure 3:
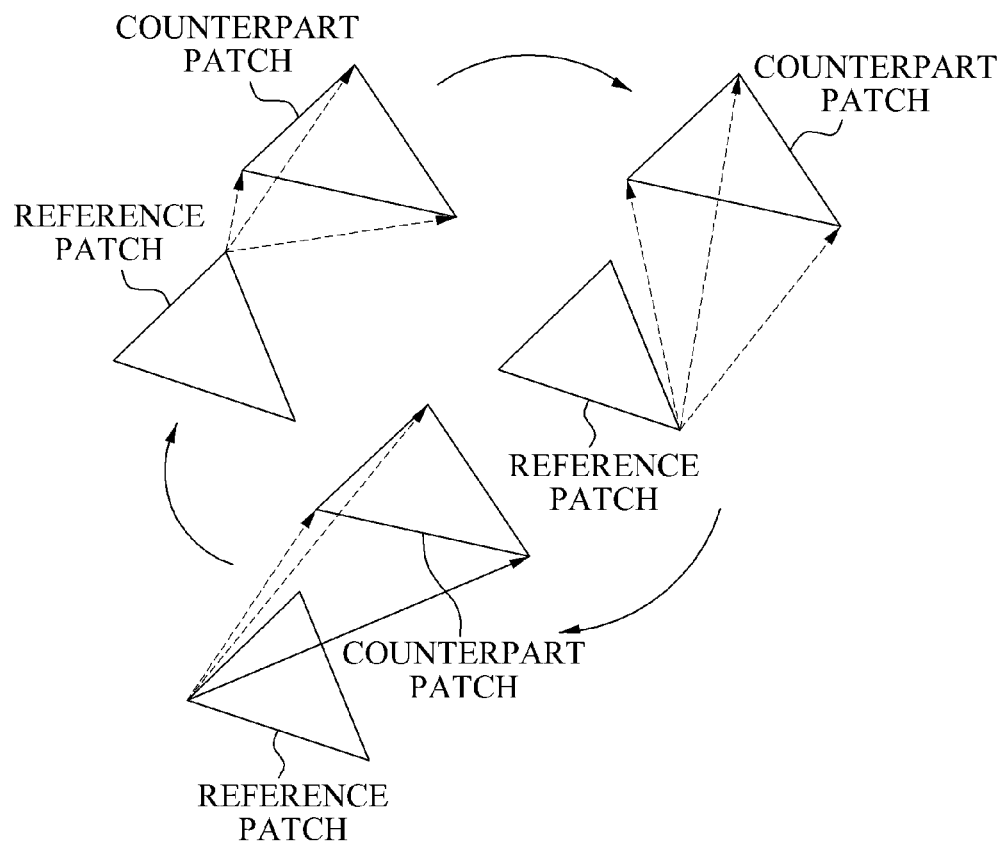
FIG. 3 illustrates a process of determining maximum/minimum value with respect to a counterpart patch.
Figure 4:
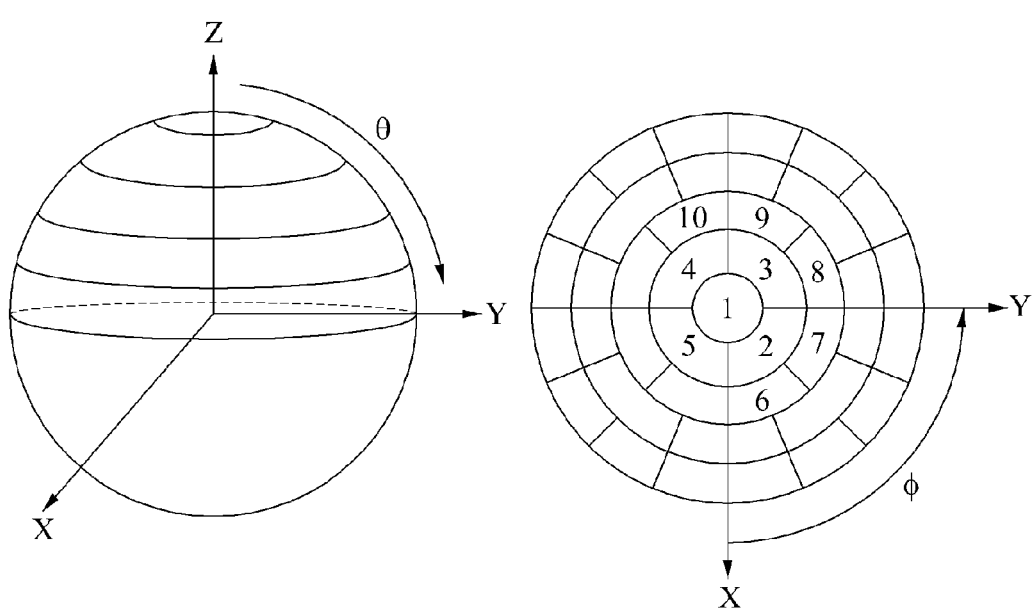
FIG. 4 illustrates a segmented region of sphere.

FIG. 2 is a block diagram illustrating a configuration of transmission path preprocessing unit. FIG. 3 illustrates a process of determining maximum/minimum value with respect to a counterpart patch, when performing a preprocess. FIG. 4 illustrates a segmented region of sphere. FIG. 5 illustrates a mapping result of a counterpart patch with respect to a segmented region of a sphere.

Referring to FIG. 2, the transmission path preprocess 107 includes a maximum/minimum determining unit 201, sphere segmenting unit 203, and a mapping unit 205.

The maximum/minimum determining unit 201 determines a maximum and minimum value of a relative location between objects or geometrical feature existing in a predetermined region.

Specifically, the maximum/minimum determining unit 201 defines a reference patch that is a side of a certain object where a ray is projected, and a counterpart patch that is a side of a other object which is secondly exposed to the projected ray reflected or diffracted from the reference patch. Subsequently, the maximum/minimum determining unit 201 defines a vector heading to a vertex of the counterpart patch from a vertex of the reference patch in Cartesian coordinates and transforms a value of the defined vector into a spherical coordinate value ($\theta$, $\phi$).

For Example, as illustrated in FIG. 3, when the reference patch and counterpart patch is a triangular patch, the maximum/minimum determining unit 201 defines a value of a vector heading to each vertex of the counterpart patch from a first vertex of the reference patch, and transforms the defined value of the vector into a spherical coordinate value ($\theta$, $\phi$). Then, the maximum/minimum determining unit 201 also determines a spherical coordinate value ($\theta$, $\phi$) with respect to a value of a vector heading to each vertex of the counterpart patch from a second and third vertex of the reference patch. The maximum/minimum determining unit 201 respectively compares between nine spherical coordinate values ($\theta$, $\phi$) and determine a maximum value ($\theta$, $\phi$) and a minimum value ($\theta$, $\phi$). In this instance, the determined maximum/minimum values indicate region where a ray that is reflected or diffracted from the reference patch and headed to the counterpart patch can pass through.

The maximum/minimum determining unit 201 may determine a maximum/minimum value of every counterpart patch corresponding to a certain reference patch.

The sphere segmenting unit 203, as illustrated in FIG. 4, may divide a sphere into m (here, m is a natural number) segmented regions using a latitude $\theta$ and a longitude $\phi$.

The mapping unit 205 may assign a number of the counterpart patch to the segmented region of the sphere according to a maximum/minimum value ($\theta$, $\phi$) of the counterpart patch. Specifically, when the maximum/minimum value ($\theta$, $\phi$) of the counterpart patch is included in a value of certain region ($\theta$, $\phi$) from among m segmented regions, the mapping unit 205, assigns the number of the counterpart patch to the certain segmented region. In this instance, it is assumed that the reference patch is in a center of the sphere. Subsequently, the mapping unit 205 tables a result of mapping of the counterpart patch with respect to the segmented region based on the reference patch after assigning the number of the counterpart patch, as illustrated in FIG. 5.

Referring to FIG. 5, the mapping table indicates a number of the counterpart patch that is assigned to the segmented region of the sphere with respect to the reference patch.

In the mapping table, a first row indicates a serial number with respect to segmented regions of the sphere. For example, the segmented regions may be 82. Also, a second row to a sixth row indicates the number of the counterpart patch that is assigned to the segmented regions of the sphere, with respect to five reference patches.

Specifically, the second row of the mapping table indicates that, with respect to a first reference patch, a counterpart patch No. 1 is distributed over segmented region Nos. 1 to 3, a counterpart patch No. 52 is distributed in a segmented region No. 31, a counterpart patch No. 59 is distributed in a segmented region No. 32. Also, no counterpart patch is distributed in segmented regions Nos. 52 to 52, and segmented regions Nos. 81 to 82.

Also, a third row of the mapping table indicates that, with respect to a second reference patch, a counterpart patch No. 82 is distributed over segmented region Nos. 1 to 2, a counterpart patch No. 62 is distributed in a segmented region No. 31, and a counterpart patch No. 22 is distributed in a segmented region No. 32.

Figure 6:
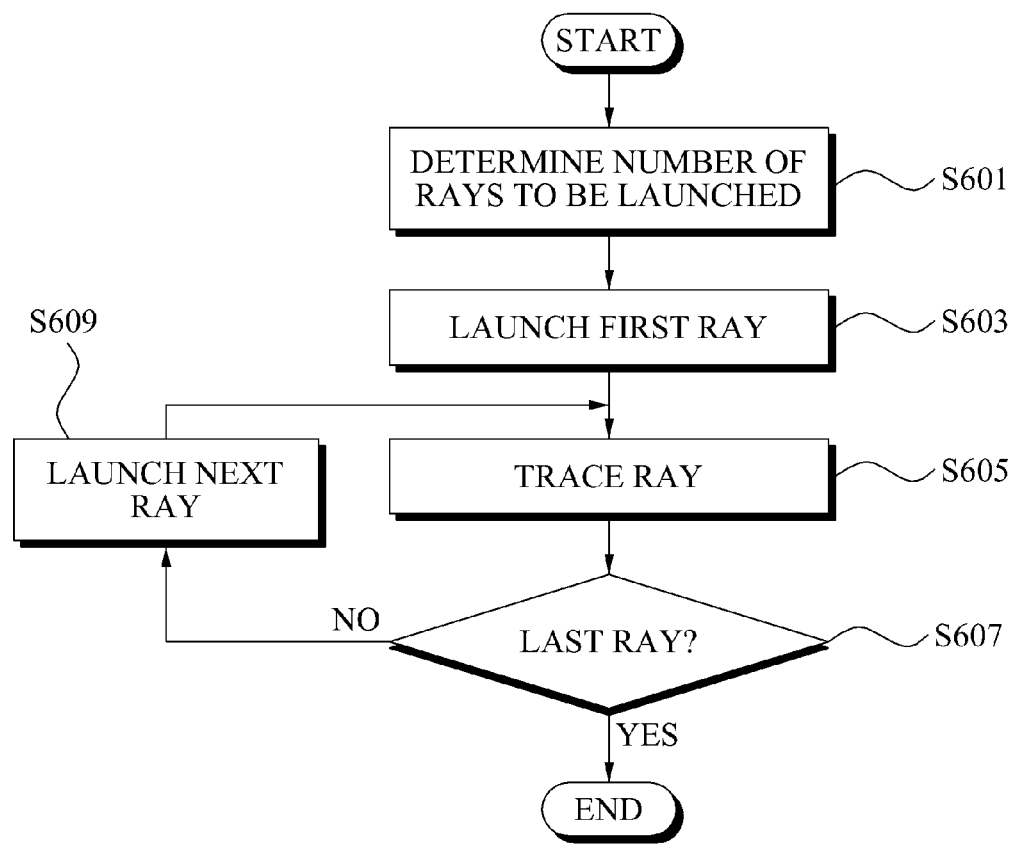
FIG. 6 is a flowchart illustrating a method for ray-tracing according to an example embodiment of the present invention.

FIG. 6 is a flowchart illustrating a method for ray-tracing according to an example embodiment of the present invention.

Referring to FIG. 6, first, a number of rays determining unit determines a number of rays to be launched from a receiving point in operation 5601.

Next, a ray launching unit launches a first ray in space in operation 5603. A launching order of priority is determined among the determined number of rays, and the first ray is launched in space.

Subsequently, a ray-tracing unit traces a transmission path of the launched ray in operation S605.

Herein, with respect to the launched ray, the ray-tracing unit traces a transmission path which is changed through a reflection or diffraction of the launched ray after projected to an object and geometric feature.

In this instance, the ray-tracing unit traces the transmission path referring to a predetermined transmission path preprocessing unit, and thereby can quickly trace the transmission path. That is, the ray-tracing unit traces the transmission path using a preprocessed path data that indicates a relative location of a counterpart patch corresponding to a side of another object that is exposed to the projected ray reflected or diffracted from a reference patch corresponding to a side of a certain object where the launched ray is projected.

Specifically, the ray-tracing unit determines the side of the certain object where the ray is projected from the transmitting point. Then, the ray-tracing unit searches for the reference patch corresponding to the determined side, refers to the counterpart patch corresponding to the side of the other object which is secondly exposed to the ray through the reflection or diffraction from the reference patch, and thereby can easily trace the transmission path.

The ray-tracing unit verifies that the launched ray is received when the ray passes through a reception radius having a center corresponding to a receiving point, and completes the ray-tracing.

However, when the ray fails to pass through the reception radius, the ray-tracing unit determines the other object, which is secondly exposed, as a reference patch and then repeats to trace the transmission path referring to the counterpart patch corresponding to the reference patch.

Subsequently, when the ray that the ray-tracing unit traced is not a last ray determined by the number of rays determining unit, a next ray is launched and the ray-tracing unit repeats tracing of a transmission path with respect to the launched ray in operations S607 and 609. In this instance, all rays launched from the ray launching unit have angles with regular intervals from each other.

Figure 7:
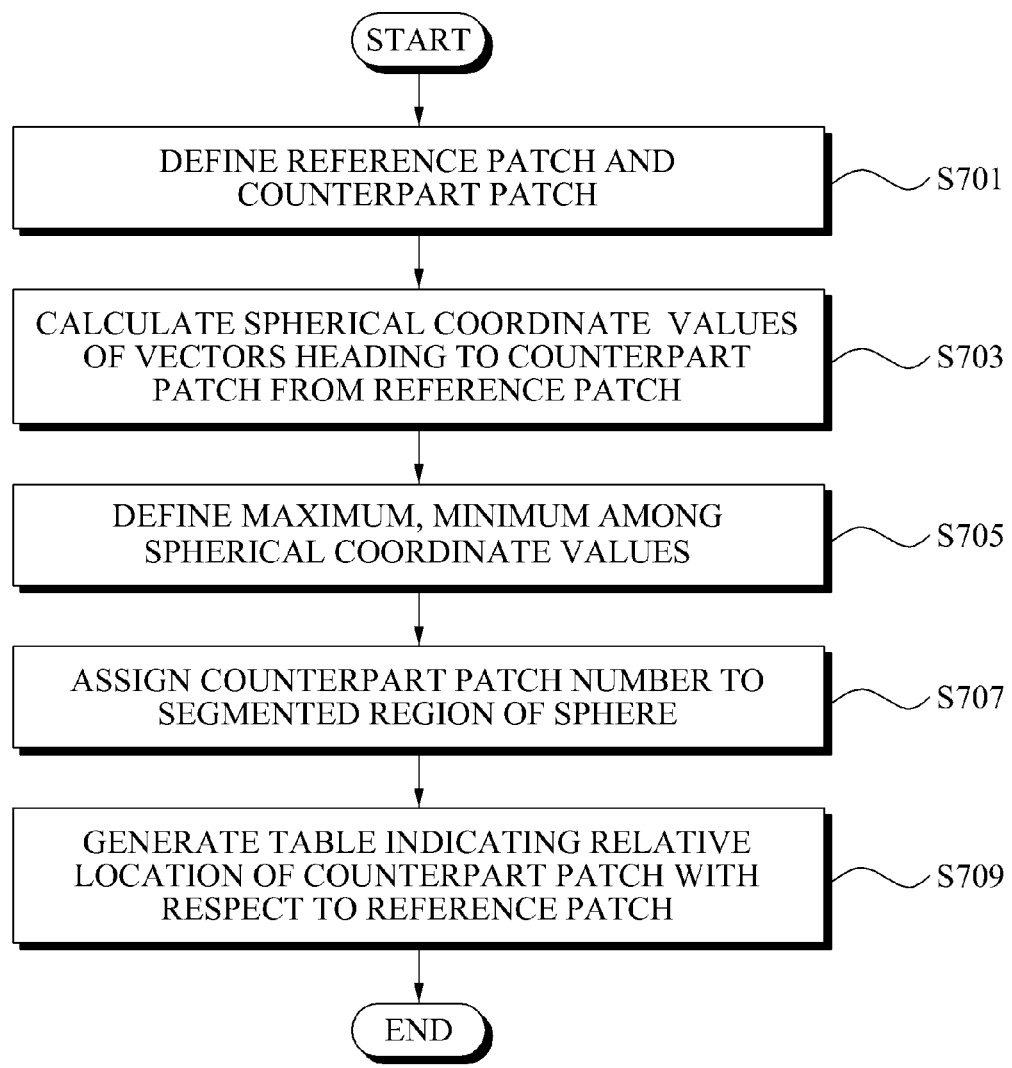
FIG. 7 is a flowchart illustrating a preprocess method.

FIG. 7 is a flowchart illustrating a preprocess method.

Referring to FIG. 7, first, a maximum/minimum determining unit defines a reference patch and a counterpart patch in operation S701.

The maximum/minimum determining unit defines the reference patch and counterpart patch between objects and geometrical feature existing in a predetermined region.

Herein, the reference patch indicates a side of a certain object where a ray is projected and the counterpart patch indicates a side of a other object which is secondly exposed to a ray through a reflection or diffraction of the ray from the reference patch.

Next, the maximum/minimum determining unit calculates spherical coordinate values of vectors heading to the counterpart patch from the reference patch in operation S703.

The maximum/minimum determining unit defines a vector heading to a vertex of the counterpart patch from a vertex of the reference patch in Cartesian coordinates and transforms a value of the defined vector into a spherical coordinate value ($\theta$, $\phi$).

The maximum/minimum determining unit determines a maximum value and minimum value among the spherical coordinate values in operation S705.

The maximum/minimum determining unit determines the maximum value and minimum value of every counterpart patches corresponding to a certain reference patch.

Subsequently, a mapping unit assigns a number of the counterpart patch to a segmented region in operation S707.

When the maximum/minimum value of the counterpart patch is included in a certain region of segmented regions of a sphere, the mapping unit assigns the number of the counterpart patch to the segmented region. After that, the mapping unit assigns every counterpart patch corresponding to the reference patch to a corresponding segmented region.

Then, the mapping unit generates a table indicating a location of the counterpart patch assigned to the segmented region based on the reference patch in operation S709.

The mapping unit performs mapping of a relative location of the counterpart patch with respect to the reference patch using the segmented region and a number of the counterpart patch, and thereby can establish database for preprocessed path data.

A method for ray-tracing according to an example embodiment predetermines a relative path between objects or geometrical feature existing in a predetermined region and performs ray-tracing using the predetermined relative path, and thereby can improve ray-tracing rate.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for ray-tracing using a ray-tracing apparatus, comprising:
   launching, by a ray-launching device of the ray-tracing apparatus, a ray from a transmitting point thereof;
   setting, by a ray-tracing device of the ray-tracing apparatus, a first side of a first object onto which the launched ray is projected as a reference patch;
   generating preprocessed path data including the reference patch and a counterpart patch, the counterpart patch being a second side of a second object corresponding to the first side of the first object, the second side being exposed to a reflected or diffracted ray that is the projected ray reflected or diffracted from the reference patch, the generating including defining the reference patch and the counterpart patch and determining a maximum value and a minimum value from among spherical coordinate values of vectors heading to the counterpart patch from the reference patch, and assigning, when the maximum and minimum values are included in a segmented region of a sphere, the counterpart patch to the segmented region, and performing mapping of the segmented region to the counterpart patch based on the reference patch; and searching, by the ray-tracing device, the preprocessed path data for the counterpart patch of the reference patch, and tracing a transmission path of the reflected or diffracted ray.

2. The method of claim 1, wherein the preprocessed path data includes a location of the counterpart patch relative to that of the reference patch.

3. The method of claim 1, wherein the tracing is repeatedly performed until the reflected or diffracted ray passes through a reception radius having a center corresponding to a receiving point.

4. A method for path preprocessing using a ray-tracing apparatus, comprising:

defining, using the ray-tracing apparatus, a reference patch and a counterpart patch from among objects in a predetermined region;

calculating, using the ray-tracing apparatus, spherical coordinate values of vectors heading to the counterpart patch from the reference patch;

determining, using the ray-tracing apparatus, a maximum value and a minimum value from among the spherical coordinate values; and assigning, when the maximum and minimum values are included in a segmented region of a sphere, the counterpart patch to the segmented region to indicate a relative location of the counterpart patch with respect to the reference patch using the ray-tracing apparatus.

5. The method of claim 4, wherein the calculating of the spherical coordinate values comprises:

defining a vector heading to a vertex of the counterpart patch from a vertex of the reference patch; and transforming the vector heading to the vertex of the counterpart patch into one of the spherical coordinate values.

6. The method of claim 4, further comprising:

calculating spherical coordinate values of another counterpart patch corresponding to the reference patch; and determining a maximum value and a minimum value from among the spherical coordinate values of the another counterpart patch.

7. An apparatus for ray-tracing, comprising:

a number of rays determining unit to determine a number of rays to be launched from a transmitting point of the apparatus;

a ray launching unit to launch the determined number of rays from the transmitting point at predetermined angles;

a ray tracing unit to search preprocessed path data for a second side of a second object corresponding to a first side of a first object, the first side of the first object being exposed to one of the launched rays, the second side of the second object being exposed to a reflected or diffracted ray that is the one of the launched rays reflected or diffracted from the first side of the first object, and to trace a transmission path of the one of the launched rays; and a transmission path preprocessing unit to generate the preprocessed path data including a reference patch and a counterpart patch, the reference patch being the first side of the first object and the counterpart patch being the second side of the second object, the transmission path preprocessing unit including a maximum/minimum determining unit to define the reference patch and the counterpart patch and to determine a maximum value and a minimum value from among spherical coordinate values of vectors heading to the counterpart patch from the reference patch, and a mapping unit to assign, when the maximum and minimum values are included in a segmented region of a sphere, the counterpart patch to the segmented region, and to perform mapping of the segmented region to the counterpart patch based on the reference patch.

\* \* \* \* \*